United States Patent
Yasunaga et al.

(10) Patent No.: US 7,350,504 B2
(45) Date of Patent: Apr. 1, 2008

(54) CONTROL APPARATUS AND METHOD FOR INNER CYLINDER DIRECT INJECTION SPARK IGNITED INTERNAL COMBUSTION ENGINE

(75) Inventors: Makoto Yasunaga, Yokohama (JP); Tomoyuki Takeda, Yokohama (JP); Akira Nakajima, Yokohama (JP); Taizo Horikomi, Kawasaki (JP); Daisuke Takaki, Yokohama (JP); Katsuaki Uchiyama, Yokohama (JP); Masatoshi Hidaka, Yokohama (JP); Hitoshi Ishii, Kanagawa (JP); Tomoyuki Shigefuji, Yokohama (JP); Masayuki Tomita, Kanagawa (JP); Mitsuhiro Akagi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/443,178

(22) Filed: May 31, 2006

(65) Prior Publication Data

US 2006/0266326 A1    Nov. 30, 2006

(30) Foreign Application Priority Data

| May 31, 2005 | (JP) | ................................ 2005-158511 |
| Jun. 16, 2005 | (JP) | ................................ 2005-175841 |
| Jun. 27, 2005 | (JP) | ................................ 2005-185911 |

(51) Int. Cl.
*F02P 5/00* (2006.01)
*F02P 5/04* (2006.01)

(52) U.S. Cl. ................................ 123/406.47; 123/299

(58) Field of Classification Search ................ 123/299, 123/300, 295, 406.47, 406.44, 406.53, 406.55; 60/284, 274
See application file for complete search history.

(56) References Cited

U.S. PATENT DOCUMENTS

| 5,865,153 | A | * | 2/1999 | Matsumoto ................. 123/299 |
| 6,112,716 | A | | 9/2000 | Tachibana |
| 6,345,499 | B1 | | 2/2002 | Nishimura et al. |

(Continued)

FOREIGN PATENT DOCUMENTS

JP    11-294220 A    10/1999

(Continued)

OTHER PUBLICATIONS

U.S. Appl. No. 11/443,179, filed May 31, 2006, Okamoto et al.

(Continued)

*Primary Examiner*—Mahmoud Gimie
(74) *Attorney, Agent, or Firm*—Foley & Lardner LLP (57) ABSTRACT

In control apparatus and method for an inner cylinder spark ignited internal combustion engine having a fuel injection valve configured to directly inject fuel into an inside of an engine cylinder and a spark plug, a super retard combustion is executed to set an ignition timing after a compression stroke top dead center and to inject fuel before the ignition timing and after the compression stroke top dead center during a predetermined engine driving condition and at least part of fuel is injected before the compression stroke top dead center to decrease a fuel injection quantity after the compression stroke top dead center during an interval which is immediately after an engine start and in which a pressure of fuel is relatively low.

18 Claims, 7 Drawing Sheets

U.S. PATENT DOCUMENTS

| | | | |
|---|---|---|---|
| 6,684,630 B2* | 2/2004 | Uchida et al. | 60/284 |
| 6,725,649 B2* | 4/2004 | Yamashita et al. | 60/284 |
| 6,772,585 B2* | 8/2004 | Iihoshi et al. | 60/277 |
| 6,880,518 B2* | 4/2005 | Shiraishi et al. | 123/295 |
| 6,895,933 B2* | 5/2005 | Miwa et al. | 123/406.47 |
| 2003/0217733 A1* | 11/2003 | Shiraishi et al. | 123/295 |
| 2005/0161020 A1 | 7/2005 | Tomita | |
| 2006/0065235 A1 | 3/2006 | Tomita et al. | |

FOREIGN PATENT DOCUMENTS

| | | |
|---|---|---|
| JP | 3325230 B2 | 7/2002 |
| JP | 2004-036461 A | 2/2004 |
| JP | 2005-214039 A | 8/2005 |

OTHER PUBLICATIONS

U.S. Appl. No. 11/246,189, filed Oct. 11, 2005, Takeda et al.

* cited by examiner

FIG.11

CONTROL APPARATUS AND METHOD FOR INNER CYLINDER DIRECT INJECTION SPARK IGNITED INTERNAL COMBUSTION ENGINE

BACKGROUND OF THE INVENTION (a) Field of the Invention

The present invention relates to an inner cylinder direct injection spark ignited internal combustion engine and, more particularly, relates to control techniques on a fuel injection timing and an ignition timing at a time of a cold start of the engine demanding an earlier temperature rise (earlier activation) of a catalytic converter of an exhaust system in the internal combustion engine.

(b) Description of the Related Art

A Japanese Patent No. 3325230 issued on Jul. 5, 2002 (which corresponds to a U.S. Pat. No. 6,345,499 issued on Feb. 12, 2002) describes a previously proposed technique in which, as a catalyst warming up method of the inner cylinder (in-cylinder) direct injection stark ignited internal combustion engine, at least twice (two times) split injections are carried out which include: a later period injection to form an air mixture fuel having a partial rich and lean air-fuel ratio within a combustion chamber within an interval of time from a suction stroke to an ignition timing; and an earlier period injection in which fuel is injected at a timing before the later period injection to enable a spreading of fire with a fuel at the later period injection and with a combustion at the later period injection to generate the air mixture fuel of a leaner air-fuel ratio than a stoichiometric air-fuel ratio, when an exhaust gas purification purpose catalytic converter is in an un-warmed up state in which a catalytic converter temperature is lower than an activation temperature of the catalytic converter, the ignition timing is retarded by a predetermined quantity toward a more retardation angle direction than an MBT (Minimum angle for Best Torque) point, an ignition timing is set before a compression stroke top dead center in a no-load region of the engine, and the ignition timing is retarded after the compression top dead center in a low-speed-and-low-load region except the no-load region. The above-described later period injection is carried out after a middle period of the compression stroke, for example, 120° BTDC (Before Top Dead Center) through 45° BTDC.

SUMMARY OF THE INVENTION

It is effective to retard the ignition timing in order to reduce HC (HydroCarbon) through the earlier activation of the catalytic converter (catalyst) and through an after burning of HC, during the cold start of the engine. In addition, it is desirable to perform an ignition at a timing after the compression stroke top dead center (an, so-called, ATDC ignition) in order to obtain a larger effect of reducing HC. It is necessary to shorten a combustion interval of time in order to have the engine perform a stable combustion by means of the ATDC ignition. In order to achieve this, it is necessary to strengthen a turbulence developed within an engine cylinder to strengthen a turbulence developed within an engine cylinder and raise a combustion speed (a flame propagation speed). In order to strengthen such a turbulence as described above, it may be considered that this turbulence is developed due to an energy of a fuel spray injected into an engine cylinder under a high pressure. However, in the technique disclosed in the above-described Japanese Patent, the first time injection (the earlier period injection) is carried out during a suction stroke and the second time injection (the later period injection) is carried out during 120° BTDC (Before Top Dead Center) through 45° BTDC in the compression stroke. In this way, since the later period fuel injection is carried out before the compression stroke top dead center, the turbulence is attenuated at a time after the compression stroke top dead center and does not contribute to a rise in the flame propagation speed by means of the ATDC ignition even if the fuel spray caused by the later period injection develops the turbulence within the engine cylinder.

For example, suppose that magnitudes of the turbulences within the engine cylinder in a case where a gas flow control valve (for example, a tumble control valve) installed within an intake port of the engine is operated and in a case where such a gas flow control valve as described above is not installed in the engine are observed. An operation of the gas flow control valve causes the turbulence developed during the suction stroke to be attenuated along with an advance of the compression stroke. Along with a collapse of a tumble flow at a later period of the compression stroke, the turbulence is rapidly attenuated after the compression stroke top dead center. An improvement in the combustion (an improvement in the flame propagation) using this turbulence cannot remarkably be expected. The same thing is applied to the turbulence caused by the fuel spray. Even if the turbulence through the fuel injection before the compression stroke top dead center is developed, the turbulence does not contribute to an ignition combustion after the compression top dead center.

Therefore, the ATDC ignition is advantageous in the rise in the exhaust gas temperature and in the reduction of HC. However, a combustion stability is not established. In the previously proposed technique described in the above Japanese Patent No. 3325230, the ignition timing is set (to a timing) before the compression stroke top dead center (a, so-called, BTDC ignition) in a no-load region.

It is, in view of the above-described current circumstances, an object of the present invention to provide control apparatus and method for the inner cylinder direct injection spark ignited internal combustion engine which can achieve an improvement in the combustion stability through the ATDC ignition for the earlier activation of the catalyst (catalytic converter) and a reduction of HC (HydroCarbon).

According to one aspect of the present invention, there is provided with a control apparatus for an inner cylinder direct injection spark ignited internal combustion engine, comprising: a fuel injection valve configured to directly inject fuel into an inside of an engine cylinder; a spark plug; and a control unit configured to execute a super retard combustion to set an ignition timing after a compression stroke top dead center and to inject fuel before the ignition timing and after the compression stroke top dead center during a predetermined engine driving condition and configured to inject at least part of fuel before the compression stroke top dead center to decrease a fuel injection quantity after the compression stroke top dead center during an interval which is immediately after an engine start and in which a pressure of fuel is relatively low.

According to another aspect of the present invention, there is provided with a control method for an inner cylinder spark ignited internal combustion engine, the engine comprising: a fuel injection valve configured to directly inject fuel into an inside of an engine cylinder; and a spark plug, the control method comprising executing a super retard combustion to set an ignition timing after a compression stroke top dead center and to inject fuel before the ignition timing and after the compression stroke top dead center during a predetermined engine driving condition; and injecting at least part of fuel before the compression stroke top dead center to decrease a fuel injection quantity after the compression stroke top dead center during an interval which is immediately after an engine start and in which a pressure of fuel is relatively low.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

First Embodiment

Figure 1:
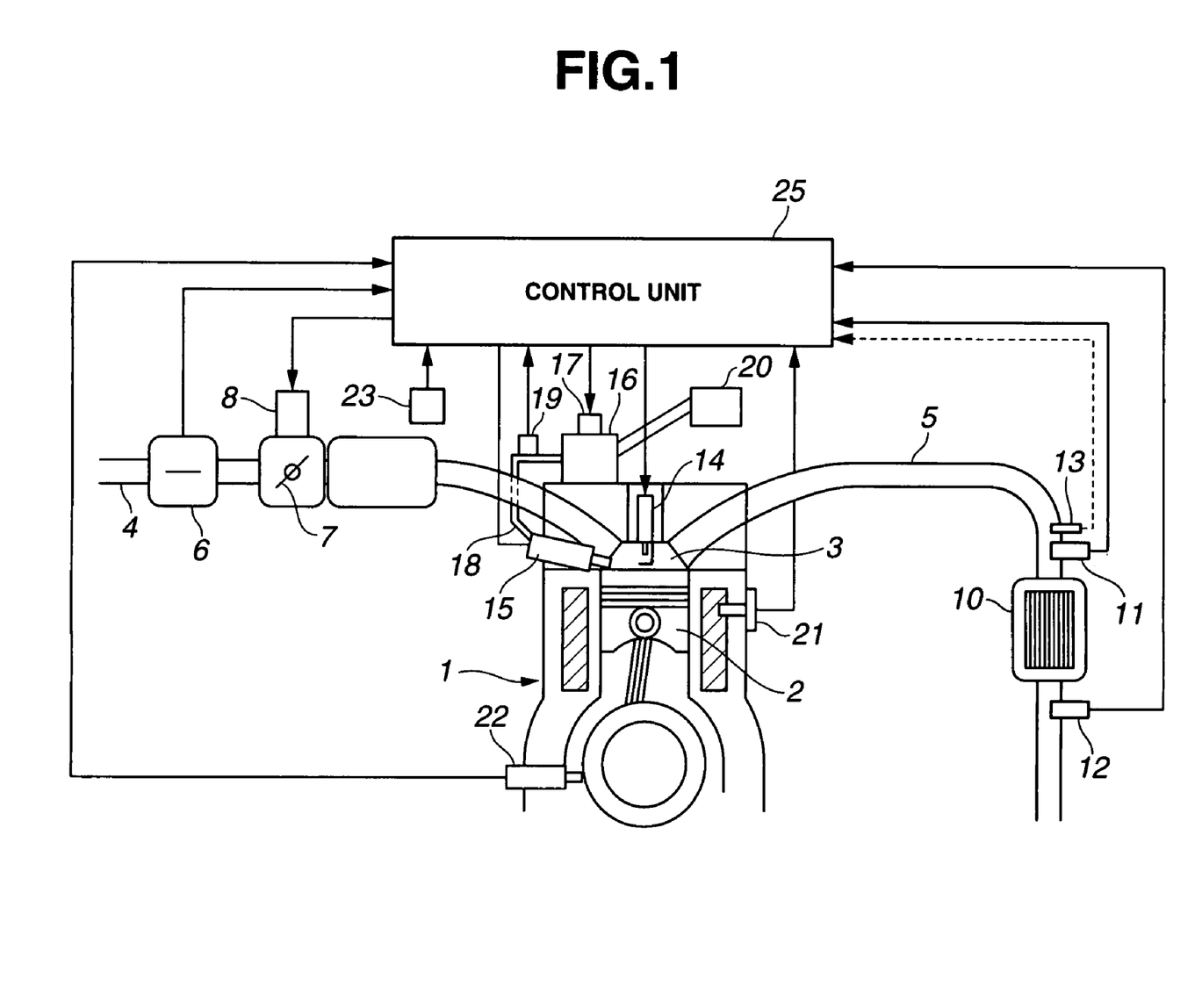
FIG. 1 is a system configuration view representing a whole inner cylinder direct injection spark ignited internal combustion engine to which a control apparatus according to the present invention is applicable.

FIG. 1 shows a structural explanatory view representing a system configuration of an inner cylinder (or in-cylinder) direct injection spark ignited internal combustion engine to which a control apparatus in a first preferred embodiment according to the present invention is applicable.

An intake passage 4 is connected to a combustion chamber 3 via an intake valve (or intake valves). Combustion chamber 3 is formed by means of a piston 2 of an internal combustion engine 1. An exhaust passage 5 is connected to combustion chamber 3 via an exhaust valve (or exhaust valves). An airflow meter 6 is disposed in intake passage 4 which detects an intake air quantity and an electronically controlled throttle valve 7 whose opening angle is controlled via an actuator 8 in response to a control signal supplied thereto. An exhaust purifying catalytic converter 10 is disposed on exhaust passage 5. Air-fuel ratio sensors 11, 12 are disposed at upstream and downstream sides of catalytic converter 10. Furthermore, an exhaust gas temperature sensor 13 is disposed in parallel to air-fuel ratio sensor 11 located at the upstream side of the catalytic converter 10 to detect an exhaust gas temperature at an inlet of catalytic converter 10.

At a center summit portion of combustion chamber 3, a spark plug 14 is disposed. In addition, a fuel injection valve 15 is disposed at a side portion of combustion chamber 3 to directly inject fuel into combustion chamber 3. This fuel injection valve 15 is supplied with pressure regulated fuel under a predetermined pressure by means of a high pressure fuel pump 16 and a pressure regulator 17 via a high pressure fuel passage 18. Hence, a control pulse causes fuel injection valve 15 of each cylinder to be opened so that fuel whose quantity is varied in accordance with an open interval of time of fuel injection valve 15 is injected. A reference numeral 19 denotes a fuel pressure sensor to detect a fuel pressure and a reference numeral 20 denotes a low pressure fuel pump which supplies fuel to high pressure fuel pump 16.

In addition, a coolant temperature sensor 21 to detect an engine coolant is disposed on engine 1 and a crank angle sensor 22 to detect a crank angle (CA) of an engine crankshaft is disposed on engine 1. Furthermore, an accelerator opening angle sensor 23 to detect a depression quantity (depression depth) of an accelerator pedal by a vehicle driver.

A control unit 25 controls a fuel injection quantity of engine 1, a fuel injection timing thereof, an ignition timing thereof, and so forth. Detection signals of various sensors described above are inputted to control unit 25. Control unit 25, in accordance with an engine driving condition detected by means of these input signals, determines whether a combustion system, namely, a homogeneous combustion or a stratified combustion should be carried out. In accordance with the determined combustion system, control unit 25 controls an opening angle of electronically controlled throttle valve 7, a fuel injection quantity through fuel injection valve 15, and a fuel injection timing through fuel injection valve 15, an ignition timing through spark plug 14, and so forth. It is noted that, after an engine warm up is finished, in a predetermined low-speed-and-low-load region, the fuel injection is carried out at an appropriate timing during a compression stroke and an ignition of fuel is carried out at a timing before a compression stroke top dead center, as an ordinary stratified combustion driving. A fuel spray is collected in a proximity of spark plug 14 in a stratified form. Thus, an extremely lean stratified combustion in which an air-fuel ratio is approximately from 30 to 40 is achieved. In addition, in a predetermined high-speed-and-high-load region, the fuel injection is carried out during a suction stroke and an ignition is carried out in a proximity to an MBT (Minimum angle for Best Torque) point before the compression stroke top dead center, as an ordinary homogeneous combustion driving. In this case, fuel becomes a homogeneous air mixture fuel within each engine cylinder. This homogeneous combustion driving includes a homogeneous stoichiometric combustion with the air-fuel ratio set to the stoichiometric air-fuel ratio and a homogeneous lean combustion with the air-fuel ratio set to a lean state of approximately from 20 to 30 according to the engine driving condition.

According to the present invention, a super retard combustion is executed to make the exhaust gas temperature high, during a cold start of engine 1 in which an earlier temperature rise in catalytic converter 10 is requested (demanded). Hereinafter, the fuel injection timing and the ignition timing in the super retard combustion will be described below with reference to FIG. 2.

Figure 2:
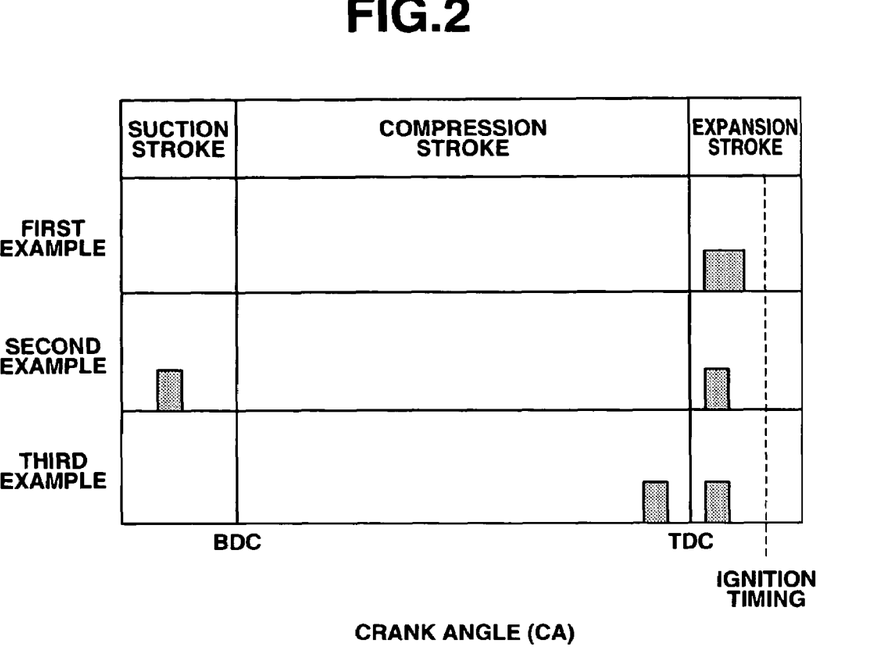
FIG. 2 is integrally a characteristic graph representing a fuel injection timing and an ignition timing on a super retard combustion in a case of a first preferred embodiment of the control apparatus according to the present invention.

FIG. 2 shows three examples of the super retard combustion. In a first example, the ignition timing is set to 15° through 30° ATDC (After Top Dead Center) (for example, 20° ATDC) and the fuel injection timing (in details, a fuel injection start timing) is set (to a timing) after the compression stroke top dead center and before the ignition timing. It is noted that, at this time, the air-fuel ratio is set to the stoichiometric air-fuel ratio or to a slightly (by a predetermined small value) leaner (approximately from 16 to 17) than the stoichiometric air-fuel ratio.

That is to say, in order to promote the warm up of the catalyst (catalytic converter 10) and to reduce HC (Hydro-Carbon), it is effective to retard the ignition timing. Then, the ignition after the compression stroke top dead center (an, so-called, ATDC ignition) is desirable. However, in order to have engine 1 perform a stable combustion by means of the ATDC ignition, it is necessary to shorten a combustion interval of time. To shorten the combustion interval of time, it is necessary to promote a flame propagation caused by a turbulence. As described above, the turbulence developed at a suction stroke and the compression stroke is attenuated. However, in this embodiment according to the present invention, a high pressure fuel injection carried out during an expansion stroke after the compression top dead center causes a gas flow to be developed. This gas flow can develop and strengthen the disturbance within the cylinder. Hence, the flame propagation at the ATDC ignition is promoted so that it becomes possible for the stable combustion to be established. It is noted that BDC in FIG. 2 denotes a Bottom Dead Center.

Next, a second example in FIG. 2 is an example in which the fuel injection is split into two times (twice fuel injections) (by control unit 25). A first time fuel injection is carried out during the suction stroke and a second time fuel injection is carried out after the compression stroke top dead center (TDC). It is noted that the ignition timing and the air-fuel ratio (a total air-fuel ratio of the two times injections) are the same as the first example.

In this way as in the second example, when the fuel injection (suction stroke injection) during the suction stroke is carried out prior to the fuel injection (expansion stroke injection) after the compression stroke top dead center, the turbulence caused by the fuel spray of the suction stroke injection is attenuated at a later half of the compression stroke and hardly givers an influence on the gas flow strengthening after the compression stroke top dead center. However, since the fuel combustion is diffused over whole combustion chamber 3, the fuel combustion contributes to the promotion of the after burning of HC through the ATDC ignition. Hence, the second example shown in FIG. 2 is effective for the HC reduction and for the exhaust gas temperature rise.

In addition, in a third example shown in FIG. 2, the fuel injection is split into two times, the first time fuel injection being carried out at the compression stroke and the second time fuel injection being carried out after the compression top dead center. In the third example, prior to the fuel injection (expansion stroke injection) after the compression stroke top dead center, the fuel injection during the compression stroke (compression stroke injection) is carried out. In this case, as compared with the suction stroke fuel injection in the second example, the compression stroke fuel injection provides a delay in the attenuation of the turbulence caused by the fuel spray of the compression stroke injection. Hence, the turbulence caused by the first time fuel injection is left. The second time fuel injection is carried out after the compression top dead center so that the turbulence can be strengthened so as to promote the turbulence developed at the first time fuel injection and a further gas flow strengthening in the proximity to the compression top dead center can be achieved.

In the case of the third example, the first time compression stroke fuel injection may be carried out at a first half of the compression stroke. However, if the first time injection is set to a later half of the compression stroke (after 90° BTDC), the turbulence in the proximity to the top dead center can furthermore be raised. Especially, if this first time compression stroke fuel injection is carried out after 45° BTDC, desirably, after 20° BTDC, the gas flow after the compression top dead center can furthermore be strengthened.

As described above, according to the super retard combustion of the first, second, and third examples described with reference to FIG. 2, the turbulence within each engine cylinder can be developed and strengthened by means of the fuel spray immediately before the ignition, the flame propagation can be promoted. In addition, the stable combustion can be achieved. Especially, since the ignition timing is retarded up to 15° through 30° ATDC, an earlier activation of catalytic converter 10 and a sufficient after burning effect to reduce HC can be achieved. In other words, even if the ignition timing is largely retarded, the fuel injection is retarded immediately before the ignition timing to retard (delay) a development timing of the turbulence. Thus, a combustion improvement due to the flame propagation improvement can be achieved.

Figure 4:
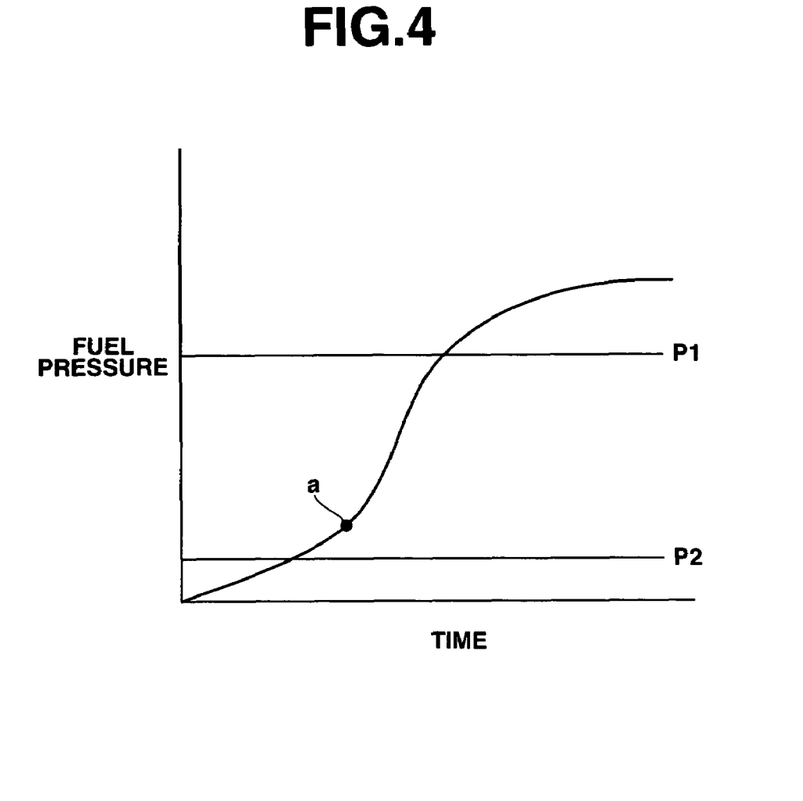
FIG. 4 is a characteristic graph representing a fuel pressure variation at a time of an engine start.
Figure 5:
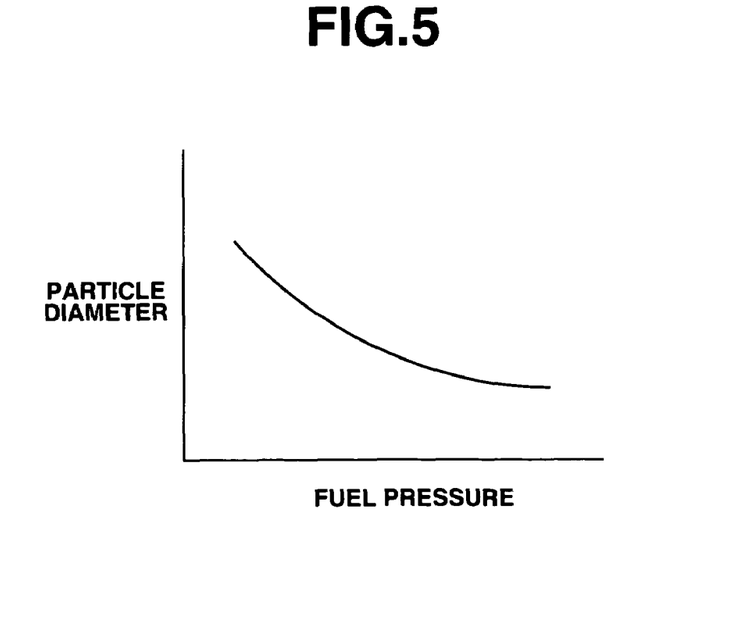
FIG. 5 is a characteristic graph representing a relationship between the fuel pressure and a fuel particle diameter.

Next, a control during the cold start of engine 1 in relation to the fuel pressure will be described below. It is herein noted that, in the control during the cold start, the third example of FIG. 2 is explained (namely, the fuel injection is split into two times injections, the first time fuel injection being carried out during the compression stroke and the second time fuel injection being carried out after the compression stroke top dead center). First example shown in FIG. 2 or second example shown in FIG. 2 may be adopted. In a case where the start of engine 1 from a cold environment is carried out, due to a temperature rise in the exhaust gas, it is desirable to execute the super retard combustion immediately after the engine start. However, the fuel pressure is insufficient (relatively low) immediately after the engine start (for example, about one or two seconds from the start of a cranking) and smoke or HC becomes worsened. FIG. 4 shows a fuel pressure variation after the start of cranking. Although this is analogous to a rise in an engine speed, after the start of cranking, an initial explosion is developed in a proximity of, for example, point a in FIG. 4. Furthermore, along with a rise in the engine speed, the fuel pressure arrives at a target fuel pressure (for example, P1 in FIG. 4). In addition, FIG. 5 shows a relationship between the fuel pressure and a fuel particle diameter in a case where fuel is injected in the proximity of the compression stroke top dead center. As appreciated from FIG. 5, as the fuel pressure becomes lower, the particle diameter becomes larger. Along with an enlargement in the particle diameter, smoke and HC become worsened.

Figure 3A:
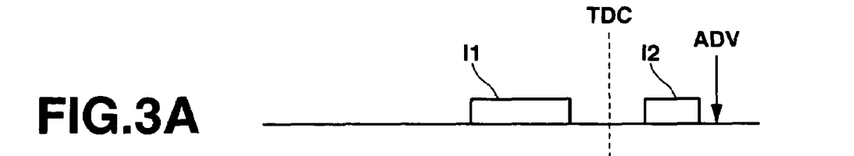
FIGS. 3A, 3B, and 3C are characteristic graphs, each representing one example of the fuel injection timing and the ignition timing in accordance with a fuel pressure.
Figure 3B:
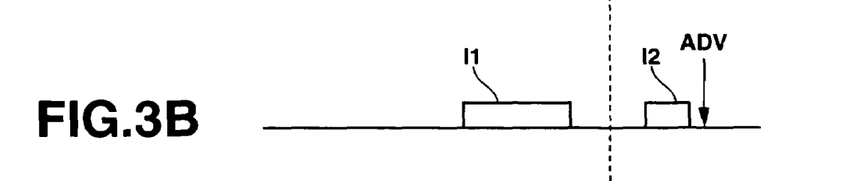

Therefore, in this embodiment, until the fuel pressure reaches to a predetermined pressure P1 shown in FIG. 4 (for example, set to about 2 MPa which is equal to or higher than an inner cylinder pressure in the compression stroke top dead center in which the piston reaches to the top dead center in the compression stroke), the injection quantity of an expansion stroke injection I2 after the compression stroke top dead center is set to be decreased as compared with the super retard combustion (FIG. 3A) when the fuel pressure is sufficient as shown in FIG. 3B and the injection quantity of compression stroke injection I1 before the compression stroke top dead center is increased. In addition, at this time, along with a decrease in the injection quantity of expansion stroke injection I2, ignition timing ADV is corrected to be advanced (moved toward an advance angle direction). The fuel injected as compression stroke injection I1 before the compression stroke top dead center is diffused into the inner cylinder before the injection timing of expansion stroke injection I2 to form a lean air-fuel mixture. Hence, even if the fuel pressure is more or less low, the worsening of smoke or HC can be suppressed.

In addition, at this time, a rate between expansion stroke injection I2 and compression stroke injection I1 becomes a rate different in accordance with the fuel pressure. The control is carried out to more decrease the rate of expansion stroke injection I2 as the fuel pressure becomes smaller. Hence, an accurate avoidance of the worsening of smoke and HC can be made at a relatively low stage of the fuel pressure.

Figure 3C:
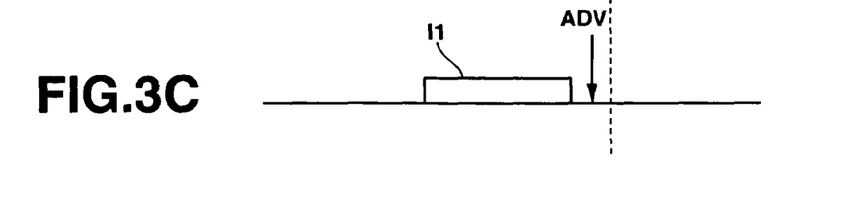

In addition, under a condition in which the fuel pressure is very low and (a width) of expansion stroke injection I2 is equal to or below a predetermined minimum injection time duration (lower limit value), all quantities of fuel are injected during the compression stroke (before the compression stroke top dead center) as shown in FIG. 3C. In other words, the rate in expansion stroke injection I2 becomes zero and rate in the compression stroke injection I1 becomes 100%. Specifically, at a stage in which the fuel pressure is lower than (target) fuel pressure P1 in FIG. 4, all quantity of fuel is injected during the compression stroke.

Hence, a form of the fuel injection at a time from the start of cranking is varied into three stages. At first, during a first stage in which the fuel pressure is vary low, specifically, to a time point at which the fuel pressure reaches to pressure P2 from a time point at which the cranking is started, all quantities of fuel are injected during the compression stroke as shown in FIG. 3C. At this fuel injection timing, the inner cylinder pressure is low as compared with that at the compression stroke top dead center and the mixture of fuel with air is promoted during a time until an occurrence of the ignition. Hence, even if the fuel pressure is low, the initial explosion start can be assured. In addition, the worsening of smoke and HC can be avoided. Next, at a second stage during which the fuel pressure is between P2 and P1 in FIG. 4, the fuel injection form in which the fuel injection is split into expansion stroke injection I2 and compression stroke injection I1 as shown in FIG. 3B is executed. In this stage, the ignition timing is in the retardation angle direction. Hence, an action of the rise in the exhaust gas temperature while suppressing the worsening of smoke and HC is started at an early stage. Then, at a third stage at which the fuel pressure has already reached to (target) fuel pressure P1 shown in FIG. 4, the super retard combustion shown in FIG. 3A is executed. Consequently, the rise action of the exhaust gas temperature can be obtained at maximum.

It is noted that the particle diameter of the fuel spray is influenced by the fuel temperature and, as the fuel temperature becomes lower, the fuel particle diameter becomes larger. Hence, as the fuel temperature becomes lower, the injection quantity of expansion stroke injection I2 becomes decreased. Thus, the injection quantity rate between expansion stroke injection I2 and compression stroke injection I1 may be corrected to more decrease the injection quantity of expansion stroke injection I2 as the fuel temperature becomes lower.

Figure 6:
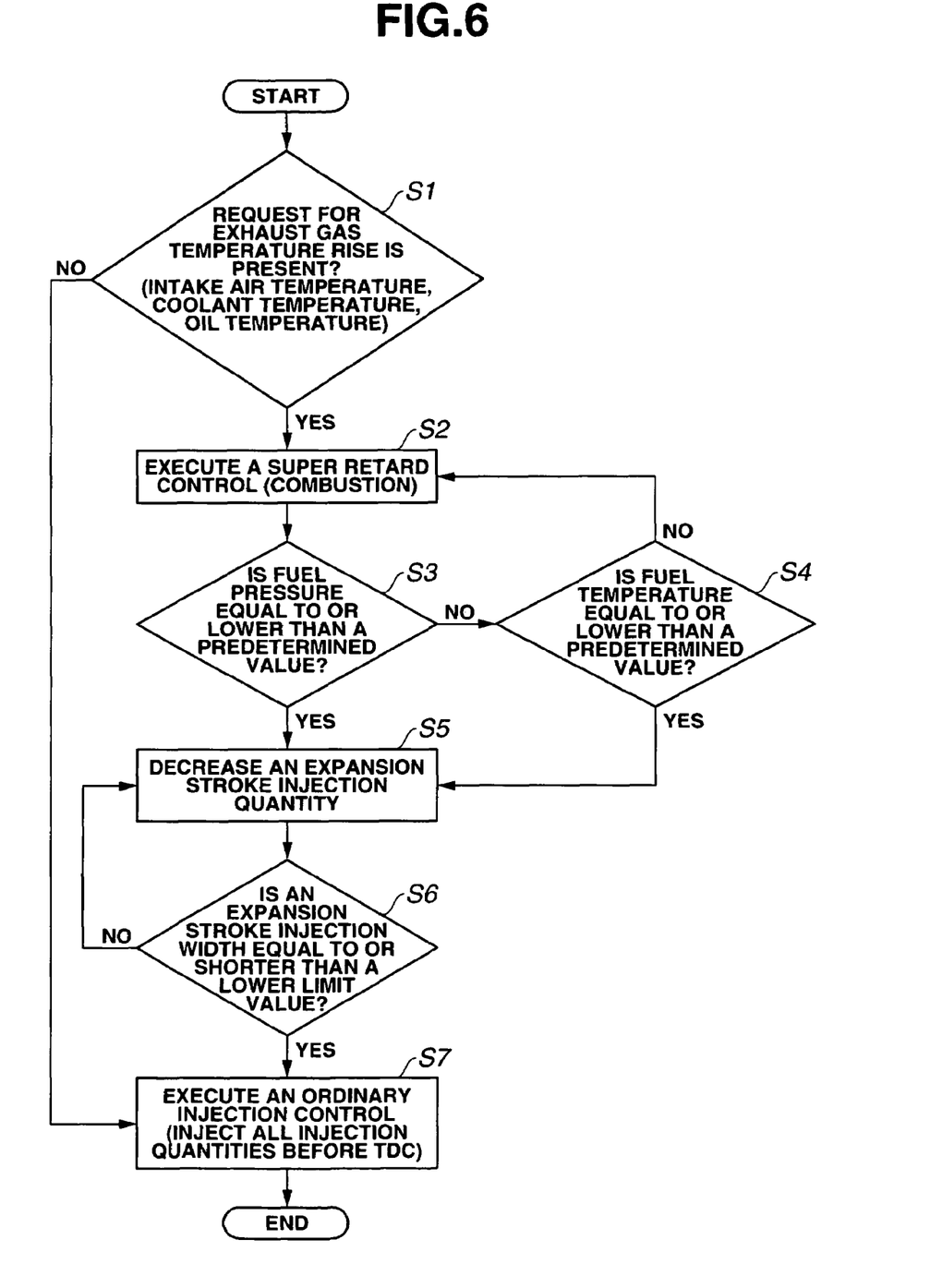
FIG. 6 is a flowchart representing a switch control procedure on the super retard combustion.

FIG. 6 shows a flowchart representing an example of a switch control procedure of the super retard combustion based on the fuel pressure described above. At a first step S1, control unit 25 determines whether a request (demand) on the rise in the exhaust gas temperature is present or absent on the basis of an intake air temperature, an engine coolant temperature, oil temperature, and/or so forth. If the request on the rise in the exhaust gas temperature is present (Yes), the routine goes to a second step S2 at which the super retard control (combustion) is executed. If no exhaust gas temperature rise request is present (No at first step S1), the routine goes to a step S7 at which an ordinary fuel injection control is executed. It is herein noted that (at step S7) all quantities of fuel are injected before the compression stroke top dead center, namely, during the compression stroke or during the suction stroke.

Next, control unit 25 determines whether the fuel pressure is equal to or lower than a predetermined value, at a third step S3. If control unit 25 determines that the fuel pressure is equal to or lower than the predetermined value (Yes at step S3), the routine goes to a step S5 at which the fuel injection in which the fuel injection is split into two times under a state in which the injection quantity during the compression stroke or suction stroke is increased together with a decrease in the injection quantity during the expansion stroke is executed, as described. If the fuel pressure is sufficient (No at step S3), the routine goes to a step S4. At step S4, control unit 25 determines whether the fuel temperature is equal to or lower than a predetermined value. If the fuel temperature is equal to or lower than the predetermined value (Yes at step S4), the routine goes to same step S5. In addition, if the fuel temperature is sufficiently high (No at step S4), the routine returns to step S2 in which the predetermined super retard combustion is executed. It is noted that, at step S5, the injection quantity at the time of the expansion stroke injection or at the time of the suction stroke injection is set in accordance with the fuel pressure and the fuel temperature. In addition, at a sixth step S6, control unit 25 determines whether the injection quantity (injection width) at the time of expansion stroke injection is equal to or less (shorter) than a (predetermined) lower limit value (predetermined minimum injection time duration). If the injection quantity at the time of expansion stroke injection is equal to or less than the predetermined lower limit value (Yes at step S6), the routine goes to step S7 in which the ordinary injection control is executed. If the injection quantity at the time of expansion stroke injection is larger than the predetermined lower limit value (No at step S6), the routine returns to step S5.

It is noted that the super retard combustion can be utilized to perform a sulfur poisoning release in a case where an NOx trap catalyst as catalytic converter 10 in the exhaust system of engine 1 is used. The NOx trap catalyst adsorbs NOx when an exhaust air-fuel ratio of the exhaust gas flowing therethrough is lean and performs the purification process due to a catalytic conversion action with the adsorbed NOx discharged. However, when a sulfurous component (SOx) in the fuel is combined with the catalyst, NOx adsorption performance is reduced. Hence, it is necessary to perform a process (so-called, sulfur poisoning release) of discharging and eliminating SOx with the catalyst under a forceful high temperature at an appropriate timing. The super retard combustion described above obtains the very high exhaust gas temperature. Thus, the super retard combustion described above becomes appropriate for the sulfur poisoning release process of the NOx trap catalyst.

In the first embodiment, the super retard combustion in which the ignition timing is set after the compression stroke top dead center and fuel is injected after the compression stroke top dead center before the ignition timing is executed during the predetermined driving condition, for example, in a case where the rise in the exhaust gas temperature is required. It is noted that, in the NOx trap catalyst which adsorbs NOx, Nox adsorption performance is reduced due to an adherence of sulfurous component (SOx) onto the NOx trap catalyst. Hence, is is necessary to execute SOx discharging process (SOx sulfur poisoning release) by rendering the catalyst forcibly to a high temperature to discharge SOx. It is possible to utilize the super retard combustion for the rise in the exhaust gas temperature when SOx discharging process is executed. In addition, in the first embodiment, especially, during the interval of time which is immediately after the engine start and in which the fuel pressure is relatively low (lower than the predetermined value), at least part of fuel is injected before the compression stroke top dead center, namely, during the suction stroke or during the compression stroke to decrease the fuel injection quantity after the compression stroke top dead center. In details, the turbulence developed during the suction stroke or compression stroke is attenuated after the compression stroke top dead center. However, the turbulence within combustion chamber 3 can be developed and strengthened according to the fuel injection executed during the expansion stroke after the compression stroke top dead center and the flame propagation at the ATDC ignition can be promoted. Hence, the super retard combustion in which the ignition timing is after the compression stroke top dead center is stably established.

In the super retard combustion in which fuel is injected after the compression stroke top dead center, if the fuel pressure is not sufficiently high, the diameter of fuel particle of the fuel spray becomes large so that the worsening of smoke and HC occurs. Since, at the proximity of the compression stroke top dead center, the inner cylinder pressure, for example, is equal to or higher than 1.5 MPa, fuel cannot sufficiently become miniaturized (minute particles) unless the fuel pressure indicate 2.0 MPa or higher. Whereas, during the engine start, the fuel is started to be raised together with the start of the cranking and rises along with the engine speed. Hence, there is a possibility that smoke and HC are developed due to the super retard combustion with the insufficient fuel pressure at the time immediately after the engine start. Thus, in the first embodiment, during the interval of time which is immediately after the engine start, the fuel injection quantity after the compression stroke top dead center is decreased and at least part of fuel is injected before the compression stroke top dead center, namely, during the suction stroke or the compression stroke. In this way, by decreasing the fuel injection after the compression top dead center, the worsening of smoke and HC due to the low fuel pressure can be suppressed.

In the first embodiment, all quantities of fuel after the compression stroke top dead center are injected when executing the super retard combustion and when the fuel pressure is relatively high and part of fuel before the compression stroke top dead center is injected when the fuel pressure is relatively low. In the first embodiment, when executing the super retard combustion, the injection of fuel is split into twice, a first fuel injection being carried out before the compression stroke top dead center and a second fuel injection being carried out after the compression stroke top dead center and, when the fuel pressure is relatively low, the rate of the fuel injection quantity at the second injection is decreased. In the first embodiment, the fuel injection quantity is controlled by control unit 25 to decrease more the rate of the fuel injection quantity after the compression stroke top dead center as the fuel pressure becomes lower. In the first embodiment, all quantities of fuel before the compression stroke top dead center are injected under a condition in which the width of the fuel injection after the compression stroke top dead center is equal to or shorter than the predetermined minimum injection time duration. In the first embodiment, the rate of the fuel injection quantity between the fuel injection after the compression stroke top dead center and the fuel injection before the compression stroke top dead center is corrected in accordance with the fuel temperature. In the first embodiment, the ignition timing is corrected to be moved toward the advance angle direction along with the decrease in the fuel injection quantity after the compression stroke top dead center when the fuel pressure is relatively low.

It is noted that, in the control method for the inner cylinder direct injection spark ignited internal combustion engine having the fuel injection valve to directly inject fuel into the inner cylinder and the spark plug, at the first stage of the engine start, all quantities of fuel are injected during the suction stroke or the compression stroke before the compression stroke top dead center and the ignition is carried out before the compression stroke top dead center, at the subsequent second stage, part of fuel is injected during the suction stroke or during the compression stroke and a remaining part of fuel is injected after the compression top dead center and the ignition is carried out after the compression top dead center and retarded than this fuel injection timing, and, at the subsequent third stage, the super retard combustion in which the rate of the fuel injection quantity after the compression top dead center is larger than that at the second stage is executed.

Second Embodiment

A second preferred embodiment of the control apparatus for the inner cylinder direct injection spark ignited internal combustion engine according to the present invention will be described below. FIG. 1 and FIG. 2 are applicable to the second embodiment and the contents of the second embodiment are generally the same as the first embodiment described above. Hence, only difference points from the first embodiment will be described below.

As described above, in FIG. 1, pressure regulator 17 is configured to be enabled to vary the fuel pressure of fuel supplied to fuel injection valve 15 as fuel pressure varying means (a fuel pressure varying section) in a relatively wide range, in the second embodiment. Control unit 25 controls fuel pressure through pressure regulator 17 in addition to the other controls described in the first embodiment.

It is noted that, after the engine warm up is finished, in the predetermined low-speed-and-low-load region, the fuel injection is carried out at the appropriate timing during the compression stroke and the ignition of fuel is carried out at the timing before the compression stroke top dead center, as the ordinary stratified combustion driving. The fuel spray is collected in the proximity of spark plug 14 in the stratified form. Thus, the extremely lean stratified combustion in which the air-fuel ratio is approximately from 30 to 40 can be achieved. At this time, the fuel pressure of fuel injected from fuel injection valve 15 is controlled along a predetermined characteristic such that, along with a rise in load, the fuel pressure of fuel injected through fuel injection valve 15 becomes gradually higher, as shown in a characteristic a of FIG. 7 so that a fuel injection interval does not become excessively long with respect to an increase in the fuel injection quantity.

As described in the first embodiment, FIG. 2 shows the three examples of the super retard combustion. In the first example, in order to obtain a development of turbulence due to the fuel spray, the fuel pressure controlled by means of pressure regulator 17 is given at a sufficiently higher level than the ordinary stratified combustion driving described above (refer to a in FIG. 7). That is to say, in order to promote a warming up of the catalyst (catalytic converter 10) and to reduce HC (HydroCarbon), it is effective to retard the ignition timing. Then, the ignition after the compression top dead center (an, so-called, ATDC ignition) is desirable. However, in order to have engine 1 perform the stable combustion by means of the ATDC ignition, it is necessary to shorten the combustion interval of time. To shorten the combustion interval of time, it is necessary to promote the flame propagation caused by the turbulence. As described above, the turbulence developed at the suction stroke and the compression stroke is attenuated. However, in this embodiment according to the present invention, the high pressure fuel injection carried out during the expansion stroke after the compression top dead center causes the gas flow to be developed. This gas flow can develop and strengthen the disturbance within the cylinder. Hence, the flame propagation at the ATDC ignition is promoted so that it becomes possible for the stable combustion to be established. FIG. 8 shows a relationship between a minute turbulence developed in the inner cylinder due to the spray itself and the fuel pressure. As shown in FIG. 8, as the fuel pressure becomes higher, the turbulence becomes actively developed.

Figure 7:
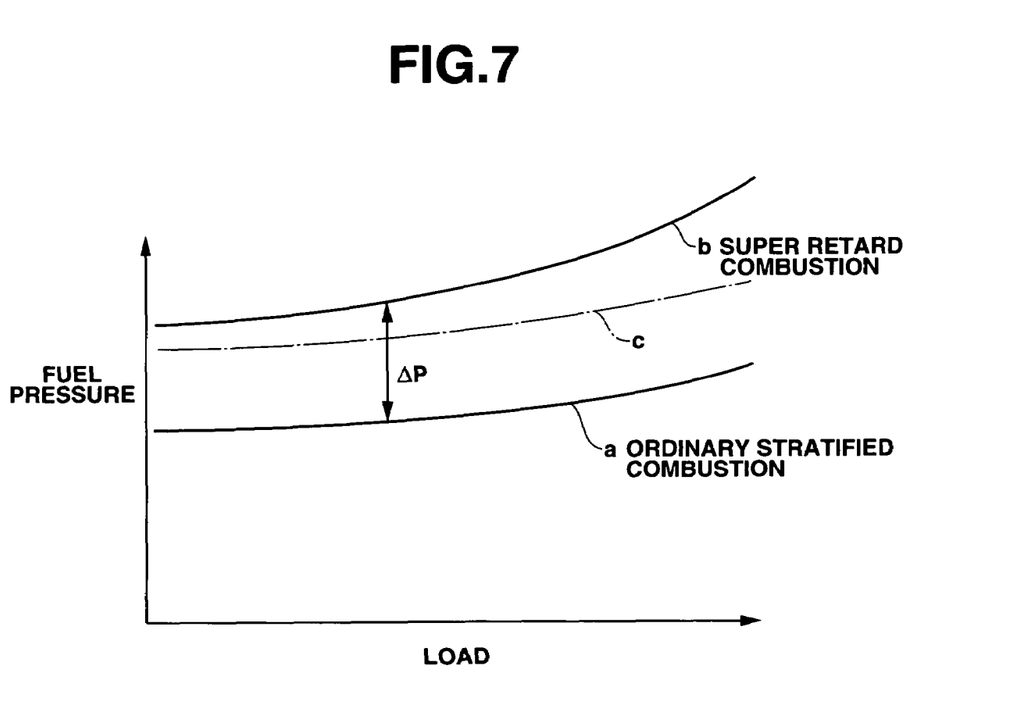
FIG. 7 is a characteristic graph representing a relationship between the fuel pressure and an engine load (load) in a case of a second preferred embodiment of the control apparatus according to the present invention.
Figure 8:
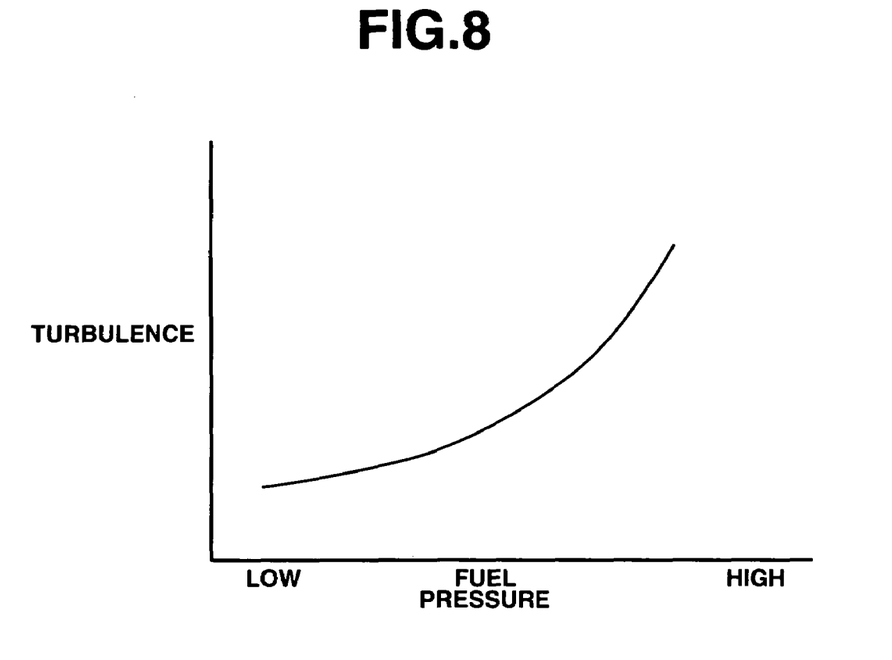
FIG. 8 is a characteristic graph representing a relationship between a minute turbulence developed due to a spraying and the fuel pressure in a case of the second embodiment of the control apparatus according to the present invention.

In this embodiment, the fuel pressure when the super retard combustion is carried out is controlled with a characteristic b in FIG. 7 with respect to the variation in the load. That is to say, as a whole, the fuel pressure is provided with a characteristic such that, as the load becomes heavier (higher), the fuel pressure becomes higher. A correction quantity ΔP (in other words, a difference between fuel pressure characteristic b in the super retard combustion driving and fuel pressure characteristic a during the ordinary stratified combustion driving at the same (engine) load), with fuel pressure a during the stratified combustion driving as reference, becomes enlarged (expanded) as the load becomes higher. A characteristic c in FIG. 7 indicates the fuel pressure characteristic in a case where a constant correction quantity is added with fuel pressure characteristic a during the ordinary stratified combustion driving as reference. As compared with fuel pressure characteristic c as described above, the fuel pressure is corrected to make the fuel pressure higher as the load becomes higher.

Figure 9:
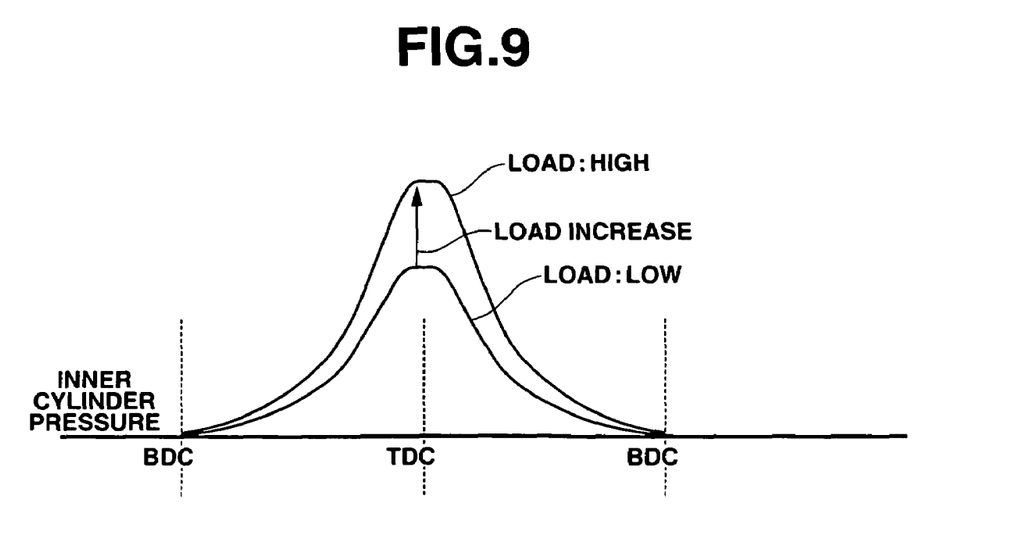
FIG. 9 is a characteristic graph representing an inner cylinder pressure variation in accordance with a magnitude of the load in the case of the second embodiment of the control apparatus according to the present invention.

FIG. 9 shows comparatively an inner cylinder pressure variation when the load is low and the inner cylinder pressure variation when the load is high. As shown in FIG. 9, as the load becomes increased, the inner cylinder pressure at compression stroke top dead center (TDC) becomes higher along with the increase in the air quantity. For such a rise in the inner cylinder pressure as described above, in this embodiment, the high fuel pressure is provided along with the rise in the load as shown in fuel pressure characteristic b in FIG. 7. An accomplishment force of the fuel spray so as to oppose against the inner cylinder pressure is raised. Under the high inner cylinder pressure, an optimum air-fuel mixture can positively be formed in the proximity of spark plug 14. In addition, the turbulence due to the energy of the spray itself can more actively be developed.

In addition to the first embodiment, in the second embodiment, especially, the fuel pressure varying section (pressure regulator 17) is configured to variably control the pressure of fuel supplied to the fuel injection valve, the stratified lean combustion is achieved by the fuel injection during the compression stroke, and the fuel pressure through the fuel pressure varying section during the super retard combustion is corrected to be higher than that during the stratified lean combustion. In the second embodiment, the fuel pressure in the super retard combustion is made higher as the engine load becomes higher. In the second embodiment, the difference (ΔP) between the fuel pressure during the super retard combustion and the fuel pressure during the stratified lean combustion at the same load is enlarged as the engine load becomes higher. It is noted that the ordinary stratified combustion means the stratified lean combustion (or extremely lean stratified combustion).

Third Embodiment

A third preferred embodiment of the control apparatus for the inner cylinder direct injection spark ignited internal combustion engine according to the present invention will be described below. FIG. 1 and FIG. 2 are applicable to the third embodiment and the contents of the third embodiment are generally the same as the first embodiment as described above. Hence, only difference points from the first embodiment will be described below.

In this embodiment, pressure regulator 17 constitutes the fuel pressure varying section (fuel pressure varying means) in the same way as the case of the second embodiment. Furthermore, in this embodiment, the fuel pressure when the super retard combustion is executed is controlled to make the fuel pressure higher as an engine speed is varied toward a higher speed side. More specifically, the fuel pressure becomes higher in proportion to a square of the engine speed. In order to perform the stable combustion in a high engine speed region, it is necessary to speed up the combustion than a case where the engine speed falls in a low speed region. The fuel pressure becomes higher than that under the low engine speed region so that a minute turbulence within the inner cylinder, namely, a minute gas flow developed due to the energy of the fuel spray is more activated and the combustion speed becomes higher. Hence, the influence by the engine speed is offset and the stable combustion can be secured even in the high engine speed region.

Figure 10:
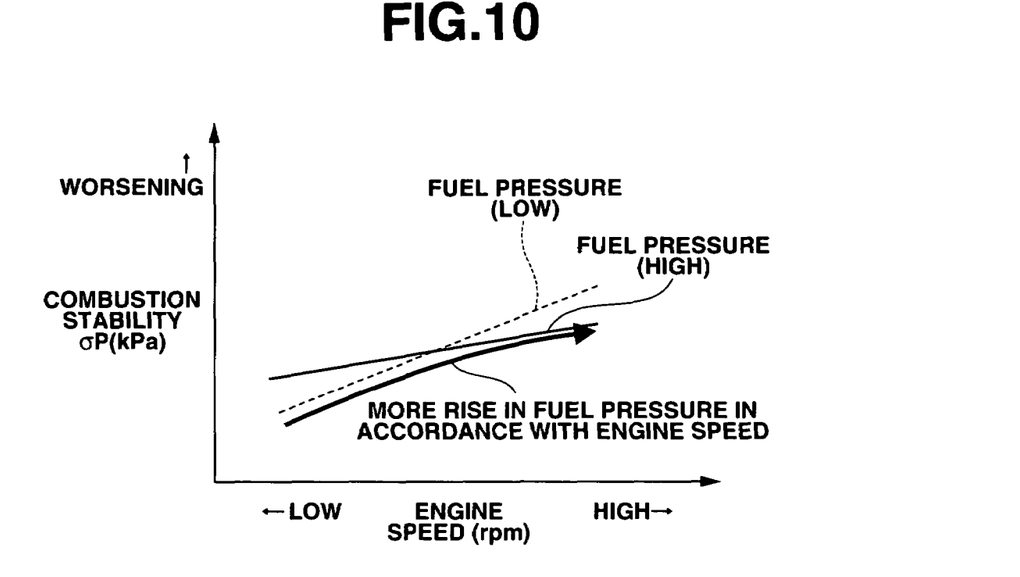
FIG. 10 is a characteristic graph representing a relationship between an engine speed and a combustion stability in a case of a third preferred embodiment of the control apparatus according to the present invention.

FIG. 10 shows an example of a variation in the combustion stability with respect to the variation in the engine speed in a case where the fuel pressure is relatively low (a broken line in FIG. 10) and in a case where the fuel pressure is relatively high (a solid line in FIG. 10). As shown in FIG. 10, the combustion stability in the case of the high fuel pressure becomes more favorable in a higher engine speed region and, on the contrary, the combustion stability in the case of the low fuel pressure becomes more favorable in a lower engine speed region. Hence, along with the rise in the engine speed as denoted by an arrow mark in FIG. 10, the fuel pressure is set to be higher. Thus, an un-stabilization of the combustion in the high speed region can be avoided.

Figure 11:
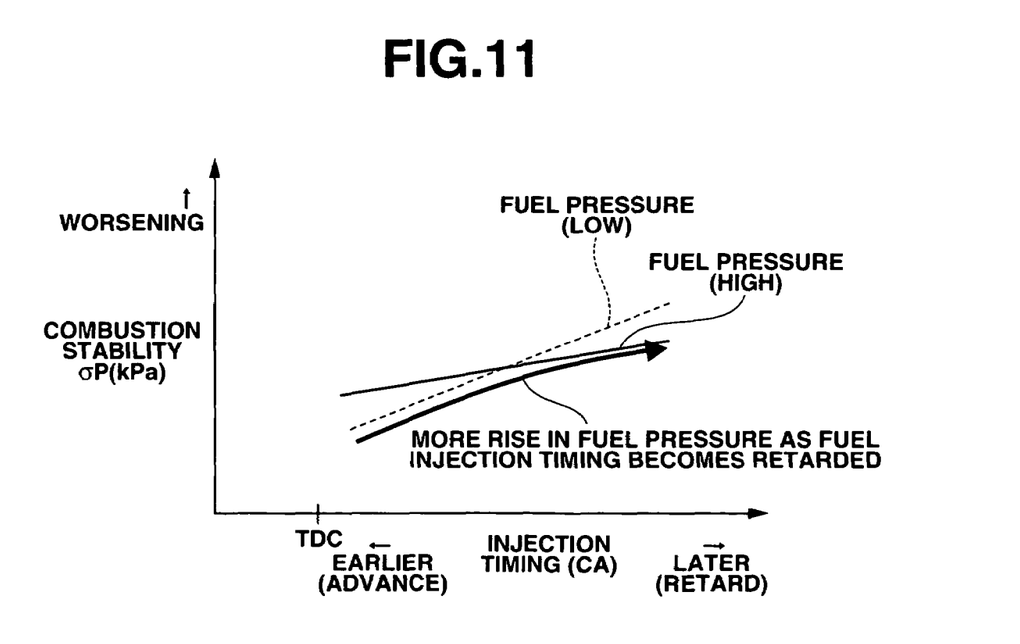
FIG. 11 is a characteristic graph representing a relationship between the fuel injection timing and the combustion stability in the case of the third preferred embodiment of the control apparatus according to the present invention.

In addition, as described above, the exhaust gas temperature becomes raised as the injection timing of the fuel injection (expansion stroke injection) after the compression stroke top dead center in the super retard combustion and the reduction of HC due to the after burning of HC is achieved. As shown in FIG. 11, there is a tendency that the combustion becomes unstable as the injection timing of the expansion stroke injection becomes retarded. However, as compared with a case where the fuel pressure is low (a broken line in FIG. 11) and a case where the fuel pressure is high (a solid line in FIG. 11), the gas flow in the case of the high fuel pressure can be strengthened. Hence, the un-stabilization of the combustion along with the retardation of the fuel injection timing is minor. Thus, as denoted by the arrow mark in FIG. 11, the fuel pressure is corrected to become higher along with the retardation of the fuel injection timing. Even if the injection timing is set to become retarded, the combustion from being un-stabilized (a combustion un-stabilization) can be avoided.

In addition to the first embodiment, in the third embodiment, especially, the fuel pressure in the super retard combustion is controlled to become higher as the engine speed becomes higher. In the third embodiment, the fuel pressure is made higher in proportion to the square of the engine speed. In addition, in the third embodiment, the fuel pressure is corrected to become higher as the fuel injection timing before the ignition timing and after the compression stroke top dead center is moved toward the more retardation angle direction. It is noted that the sentence such that the fuel pressure is relatively low or is relatively high has the same meaning that the fuel pressure is higher than the predetermined value or equal to or lower than the predetermined value.

This application is based on a prior Japanese Patent Applications No. 2005-185911 filed in Japan on Jun. 27, 2005, No. 2005-158511 filed in Japan on May 31, 2005, and No. 2005-175841 filed in Japan on Jun. 16, 2005, the disclosures of respective these Japanese Patent Applications being hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for an inner cylinder direct injection spark ignited internal combustion engine, comprising:
a fuel injection valve configured to directly inject fuel into an inside of an engine cylinder;
a spark plug; and
a control unit configured to execute a super retard combustion to set an ignition timing after a compression stroke top dead center and to inject at least part of the fuel before the ignition timing and after the compression stroke top dead center when a fuel pressure is high, configured to set the ignition timing after the compression stroke top dead center and to inject at least part of the fuel before the compression stroke top dead center to decrease a fuel injection quantity when the fuel pressure is sufficient, and to set the ignition timing before the compression stroke top dead center and to inject all quantities of the fuel before the compression stroke top dead center during an interval which is immediately after an engine start and in which the pressure of fuel is relatively low.

2. The control apparatus for the inner cylinder direct injection spark ignited internal combustion engine as claimed in claim 1, wherein the control unit is configured to inject all quantities of fuel after the compression stroke top dead center when executing the super retard combustion and when the fuel pressure is relatively high and is configured to inject part of the fuel before the compression stroke top dead center when the fuel pressure is relatively low.

3. The control apparatus for the inner cylinder direct injection spark ignited internal combustion engine as claimed in claim 1, wherein, when executing the super retard combustion, the control unit is configured to split the injection of fuel into a first fuel injection being carried out before the compression stroke top dead center and a second fuel injection being carried out after the compression stroke top dead center and, when the fuel pressure is relatively low, the control unit is configured to decrease a rate of the fuel injection quantity at the second fuel injection.

4. The control apparatus for the inner cylinder direct injection spark ignited internal combustion engine as claimed in claim 1, wherein the control unit is configured to control the fuel injection quantity to decrease the rate of the fuel injection quantity after the compression stroke top dead center as the fuel pressure becomes lower.

5. The control apparatus for the inner cylinder direct injection spark ignited internal combustion engine as claimed in claim 4, wherein the control unit is configured to inject all quantities of fuel before the compression stroke top dead center under a condition in which a width of the fuel injection after the compression stroke top dead center is equal to or shorter than a predetermined minimum injection time duration.

6. The control apparatus for the inner cylinder direct injection spark ignited internal combustion engine as claimed in claim 1, wherein the control unit is configured to correct a rate of the fuel injection quantity between the fuel injection after the compression stroke top dead center and the fuel injection before the compression stroke top dead center in accordance with a fuel temperature.

7. The control apparatus for the inner cylinder direct injection spark ignited internal combustion engine as claimed in claim 1, wherein the control unit is configured to correct the ignition timing to be moved toward an advance angle direction along with a decrease in the fuel injection quantity after the compression stroke top dead center when the fuel pressure is relatively low.

8. The control apparatus for the inner cylinder direct injection spark ignited internal combustion engine as claimed in claim 1, wherein the control apparatus further comprises a fuel pressure varying section configured to variably control the pressure of fuel supplied to the fuel injection valve, a stratified lean combustion is achieved by the fuel injection during the compression stroke, and the control unit is configured to correct the fuel pressure through the fuel pressure varying section during the super retard combustion to be higher than that during the stratified lean combustion.

9. The control apparatus for the inner cylinder direct injection spark ignited internal combustion engine as claimed in claim 8, wherein the control unit is configured to make the fuel pressure in the super retard combustion higher as an engine load becomes higher.

10. The control apparatus for the inner cylinder direct injection spark ignited internal combustion engine as claimed in claim 9, wherein the control unit is configured to enlarge a difference between the fuel pressure during the super retard combustion and the fuel pressure during the stratified lean combustion at the same load as the engine load becomes higher.

11. The control apparatus for the inner cylinder direct injection spark ignited internal combustion engine as claimed in claim 1, wherein the control unit is configured to control the fuel pressure in the super retard combustion to become higher as an engine speed becomes higher.

12. The control apparatus for the inner cylinder direct injection spark ignited internal combustion engine as claimed in claim 11, wherein the control unit is configured to make the fuel pressure higher in proportion to a square of the engine speed.

13. The control apparatus for the inner cylinder direct injection spark ignited internal combustion engine as claimed in claim 11, wherein the control unit is configured to correct the fuel pressure to become higher as the fuel injection timing before the ignition timing and after the compression stroke top dead center is moved toward a more retardation angle direction.

14. The control apparatus for the inner cylinder direct injection spark ignited internal combustion engine as claimed in claim 1, wherein, when a rise in temperature of an exhaust gas temperature is requested which is a predetermined engine driving condition, the control unit is configured to execute the super retard combustion.

15. The control apparatus for the inner cylinder direct injection spark ignited internal combustion engine as claimed in claim 1, wherein the ignition timing in the super retard combustion is 15° CA through 30° CA after the compression stroke top dead center.

16. The control apparatus for the inner cylinder direct injection spark ignited internal combustion engine as claimed in claim 1, wherein an air-fuel ratio in the super retard combustion is a stoichiometric air-fuel ratio or leaner by a predetermined small value than the stoichiometric air-fuel ratio.

17. A control method for an inner cylinder spark ignited internal combustion engine, the engine comprising: a fuel injection valve configured to directly inject fuel into an inside of an engine cylinder; and a spark plug, the control method comprising:
   executing a super retard combustion to set an ignition timing after a compression stroke top dead center and to inject at least part of the fuel before the ignition timing and after the compression stroke top dead center when a fuel pressure is high;
   setting the ignition timing after the compression stroke top dead center and injecting at least part of the fuel before the compression stroke top dead center to decrease a fuel injection Quantity, when the fuel pressure is sufficient; and
   setting the ignition timing before the compression stroke top dead center and injecting all quantities of the fuel before the compression stroke top dead center during an interval which is immediately after an engine start and in which the pressure of fuel is relatively low.

18. A control apparatus for an inner cylinder direct injection spark ignited internal combustion engine, comprising:
   fuel injection valve means for directly injecting fuel into an inside of an engine cylinder;
   spark plug means; and
   controlling means for executing a super retard combustion to set an ignition timing after a compression stroke top dead center and to inject at least part of the fuel before the ignition timing and after the compression stroke top dead center when a fuel pressure is high, for setting the ignition timing after a compression stroke top dead center and injecting at least part of the fuel before the compression stroke top dead center to decrease a fuel injection quantity when the fuel pressure is sufficient and for setting the ignition timing before a compression stroke top dead center and injecting all quantities of the fuel before the compression stroke top dead center during a interval which is immediately after an engine start and in which a pressure of fuel is relatively low.

* * * * *